United States Patent [19]

Vergin

[11] Patent Number: 5,751,129
[45] Date of Patent: May 12, 1998

[54] MEMORY SEAT MODULE HAVING INTEGRATED SENSORS

[75] Inventor: William E. Vergin, Sterling Heights, Mich.

[73] Assignee: Invotronics Manufacturing, Farmington Hills, Mich.

[21] Appl. No.: 726,878

[22] Filed: Oct. 4, 1996

[51] Int. Cl.$^6$ ........................................................ B60N 2/04
[52] U.S. Cl. ........................ 318/467; 318/625; 318/626; 297/330
[58] Field of Search ............................ 318/567, 568.1, 318/625, 626, 663, 466, 467, 468; 388/907.5; 296/65.1; 297/330, 344.17, 344.2, 344.23

[56] References Cited

U.S. PATENT DOCUMENTS

| | | |
|---|---|---|
| 3,934,928 | 1/1976 | Johnson . |
| 4,283,036 | 8/1981 | Tsuda et al. . |
| 4,304,386 | 12/1981 | Nagashima et al. . |
| 4,404,632 | 9/1983 | Harada et al. . |
| 4,434,468 | 2/1984 | Caddick et al. . |
| 4,449,752 | 5/1984 | Yasumatsu et al. . |
| 4,451,887 | 5/1984 | Harada et al. . |
| 4,460,217 | 7/1984 | Tsuda et al. . |
| 4,497,518 | 2/1985 | Nishimura et al. . |
| 4,615,551 | 10/1986 | Kinaga et al. . |
| 4,639,038 | 1/1987 | Heling . |
| 4,652,052 | 3/1987 | Hessler et al. . |
| 4,727,302 | 2/1988 | Mizuta et al. . |
| 4,728,873 | 3/1988 | Inoue et al. . |
| 4,808,897 | 2/1989 | Saito et al. . |
| 4,845,620 | 7/1989 | Parker . |
| 4,853,687 | 8/1989 | Isomura et al. . |
| 4,881,774 | 11/1989 | Bradley et al. . |
| 4,909,560 | 3/1990 | Ginn . |
| 4,995,669 | 2/1991 | Croft . |
| 5,004,967 | 4/1991 | Ogasawara . |
| 5,006,771 | 4/1991 | Ogasawara . |
| 5,014,958 | 5/1991 | Harney . |
| 5,092,197 | 3/1992 | Hauger . |
| 5,137,331 | 8/1992 | Colozza . |
| 5,163,734 | 11/1992 | Hakansson . |
| 5,164,645 | 11/1992 | Furuse et al. . |
| 5,169,112 | 12/1992 | Boyles et al. . |
| 5,190,349 | 3/1993 | Austin, Jr. et al. . |
| 5,197,007 | 3/1993 | Parker . |
| 5,352,019 | 10/1994 | Bauer et al. . |
| 5,390,981 | 2/1995 | Griswold . |
| 5,407,165 | 4/1995 | Balocke . |
| 5,467,002 | 11/1995 | Brooks . |
| 5,483,853 | 1/1996 | Moradell et al. . |
| 5,536,069 | 7/1996 | Bray et al. . |

*Primary Examiner*—Bentsu Ro
*Attorney, Agent, or Firm*—Pennie & Edmonds LLP

[57] ABSTRACT

An electronic memory seat module having integrated sensors is disclosed. The module is mounted on a seat frame which, in turn, is mounted on a fixed base member. Position sensors are mounted in or on the module. Mechanical linkages are provided between adjustable members belonging to the seat frame and the sensors. The linkages translate movement of the structural members into a motion which can be sensed by the sensors. This sensed position can then be stored by an electronic memory unit for later recall.

21 Claims, 6 Drawing Sheets

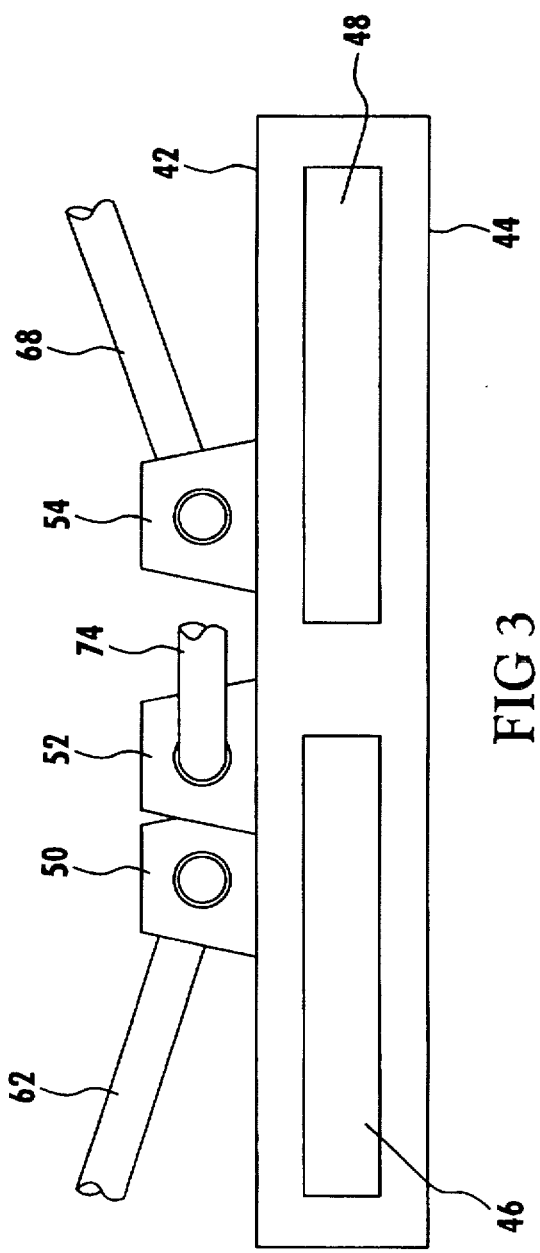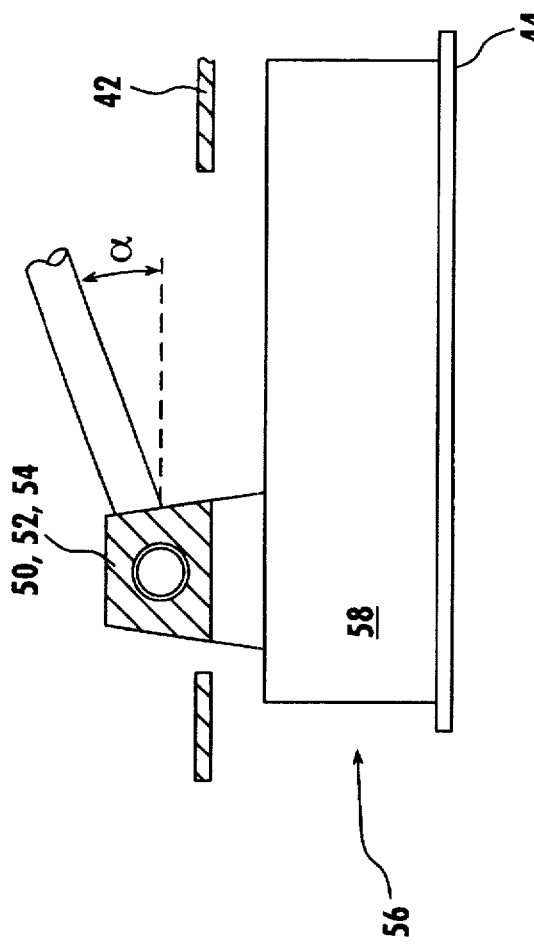

MEMORY SEAT MODULE HAVING INTEGRATED SENSORS

FIELD OF THE INVENTION

The present invention relates to seats, especially those found in motor vehicles. More particularly, it concerns seats which are equipped with position sensors for detecting the configuration of a vehicle seat, and a memory seat module which stores this position data for later recall and reconfiguration.

BACKGROUND

One feature offered in motor vehicles is a power seat which can be adjusted to suit an occupant's liking. The longitudinal position, the height, and the pitch of the seat, along with the angle of the backrest, are among the various parameters which one may adjust in a typical seat. A plurality of seat motors, when energized, move various structural members of the seat frame. By activating controls mounted on the seat, an occupant energizes one or more of these seat motors. This causes the corresponding seat motors to move the seat frame's structural members and ultimately adjusts the seat to his or her liking.

If a particular seat in a vehicle is always occupied by the same person, that person can adjust the controls once and the seat will remain in that first position. No further adjustment would be needed and there would be no need to retain position information corresponding to that person's preferences.

The more likely scenario is that a particular seat will be occupied by a primary occupant in most instances, but will also be used by other, secondary occupants, from time to time. When a secondary occupant uses the seat, he or she may adjust it to his or her own liking, thereby placing the seat in a second position. This destroys the first position set by the primary occupant, requiring him to bring the seat back to the first position the next time he uses it. This, of course, entails activating the controls once again until the seat has been adjusted back to the first position.

To save the primary occupant the trouble of having to manually activate the controls to restore the seat to the first position, an electronic memory seat module is provided. A memory seat module, familiar to those skilled in the art, typically includes A/D converters, data and control logic, microprocessors, and the like. It receives and retains position information, and includes a controller which allows it to return the seat to the first position, usually at the touch of a single button.

The position information is provided to the memory seat module by a plurality of sensors. Typically, these sensors are placed on, or proximate to, the seat motors themselves. Arranged in this way, each sensor keeps track of what its corresponding seat motor has done relative to some reference position. This information is conveyed from the sensors to the memory seat module via electrical wiring. Three kinds of sensors are commonly employed for these purposes, potentiometer. Hall effect sensors, and motor commutator pulse generators. Each of these will be briefly discussed.

Potentiometers are typically attached to a seat motor, or to a seat motor cable. They produce an analog voltage which varies as the motor rotates. A memory seat module is then equipped with an A/D converter which converts the analog signal into a digital signal for further processing.

Hall effect sensors are based on electromagnetic principles. They are usually mounted in seat motors and produce electronic pulses as the motor rotates. The memory seat module then counts these pulses to keep track of seat position.

Motor commutator pulses are based on monitoring the current through a seat motor. As the motor rotates, the commutators on the armature make and break contact with the brushes. This creates electrical pulses which are filter- and signal-conditioned by electronics in the memory seat module and converted into digital signals. These digital signals are then counted to keep track of seat position.

There are four disadvantages to the potentiometer and Hall effect sensors arranged as described above. First, their placement in the seat motors adds to the initial cost of these motors. Second, their placement also increases maintenance costs because the motor itself may have to be removed to replace a faulty sensor. Third, their placement increases the likelihood that the sensors will malfunction due to the stress of being positioned next to the motor. And finally, as the sensors are co-located with the motors, wiring harnesses connecting the sensors to the memory seat module must be provided. This adds to the complexity and cost of the seat assembly.

There are three disadvantages to the motor commutator pulse sensing. First, extensive filter and signal conditioning circuitry add to the cost and size of the module. Second, this technique has shown to be less accurate than either the Hall effect or potentiometer based sensors. And finally, previous production experience has shown that the seat: motors needed to be sorted for signal quality.

SUMMARY OF THE INVENTION

The present invention overcomes the aforementioned drawbacks by removing the sensors from the motors and integrating them into a memory seat module. Mechanical linkages are provided between structural seat frame members and the sensors. As these frame members move, the linkages to which they are connected cause the sensors to output a signal in response to a movement of the structural members.

In one embodiment of the present invention, the memory seat module is mounted on a seat frame and includes electronic circuitry to process the output from the sensors. This output provides position data which is stored and then later recalled so that the seat frame may be returned to its initial position.

The memory seat module may also be provided with a gear rotatably mounted thereon. This gear is engaged to a gear rack which is mounted on the base. As the memory seat module travels with the seat frame back and forth along a longitudinal axis, the gear turns. Sensors within the memory seat module keep track of the gear's rotations to gauge the position of the memory module, and thus the seat frame, relative to the base.

BRIEF DESCRIPTION OF THE DRAWINGS

The present invention is described with reference to the following figures wherein:

FIG. 3 is a side view of the memory seat module.

FIG. 4 is a cross-sectional view of the memory seat module along section line 4—4 in FIG. 2.

DETAILED DESCRIPTION OF THE INVENTION

Figure 1:
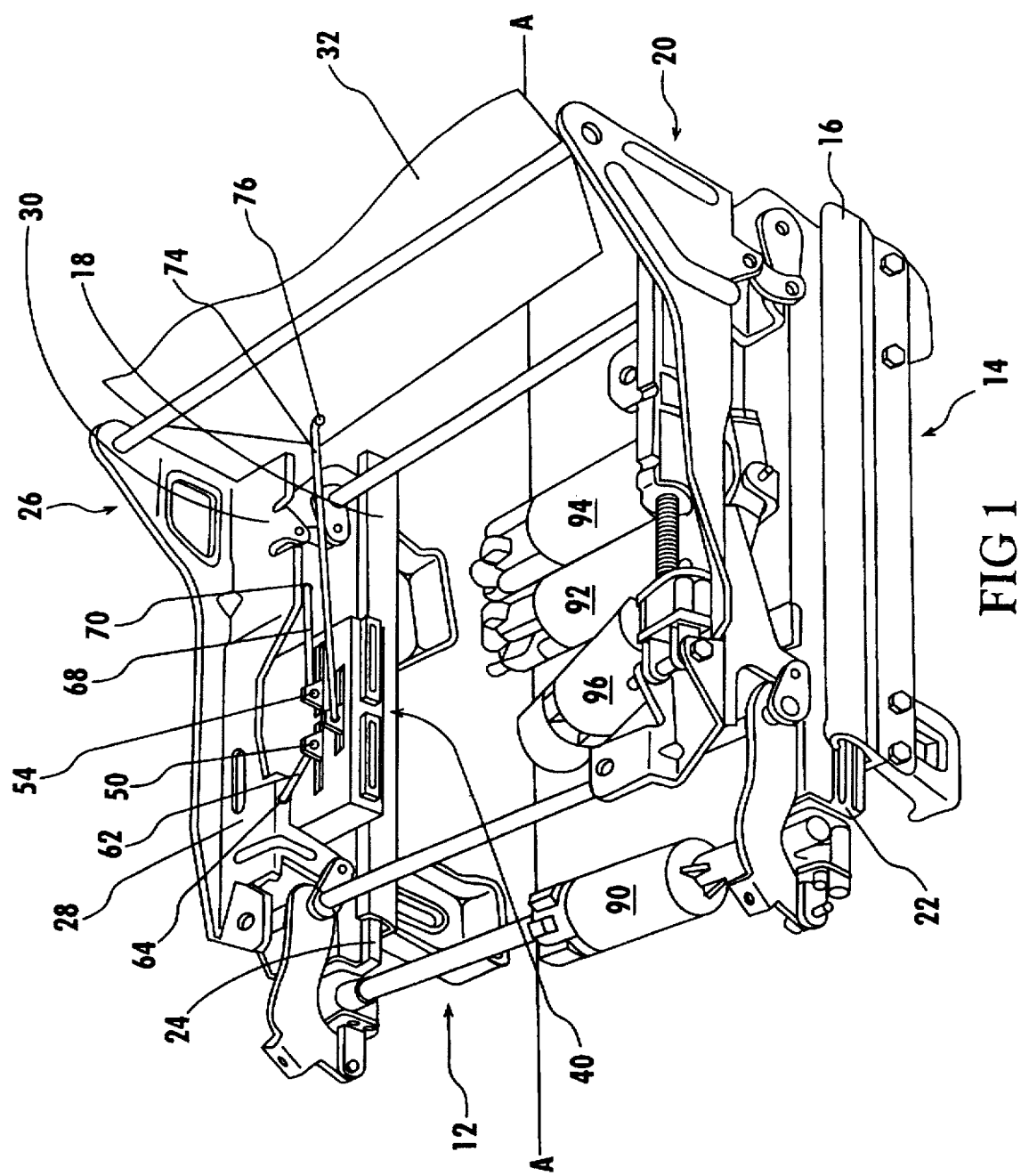
FIG. 1 is a top perspective view of a memory seat module installed in a seat assembly in accordance with the present invention.

FIG. 1 shows a seat assembly 10 in accordance with the present invention. The seat assembly is provided with stationary base members 12, 14. In the preferred embodiment, base members 12, 14 are shown as separate structures arranged around a longitudinal axis A. As known to those skilled in the art, base members 12, 14, could just as easily be connected to each other, thus forming a single base member.

Base members 12, 14 are provided with guide rails 16, 18, respectively. A seat frame, shown generally as 20, is mounted on the base members 12, 14 via guides 22, 24. Guide rails 16, 18 mate with guides 22, 24 which travel along longitudinal axis A, thus moving the seat frame 20 horizontally, forward and backwards, in response to activation by motor 92.

The seat frame 20 is provided with a seat tilt member 26 having a forward portion 28 and a rearward portion 30. The forward and rearward portions of the seat tilt member can be selectively raised and lowered relative to said base member 12 by activation of the motors 90, 94, as known to those skilled in the art.

A seatback panel 32 which, in normal use, supports the backrest of a seat, also forms part of the seat frame 20. The orientation of the seatback panel 32 is adjusted by activation of the motor 96. Motors 90, 92, 94 and 96 are all mounted on the seat assembly.

A memory seat module 40 is mounted on the guide 24 just above guide rail 18. The module 40 is provided with a housing having an upper surface 42, a bottom surface 44 and side walls. It is also provided with a pair of electrical connectors 46, 48 for interfacing with power sources, motors, control signals, and the like.

Figure 2:
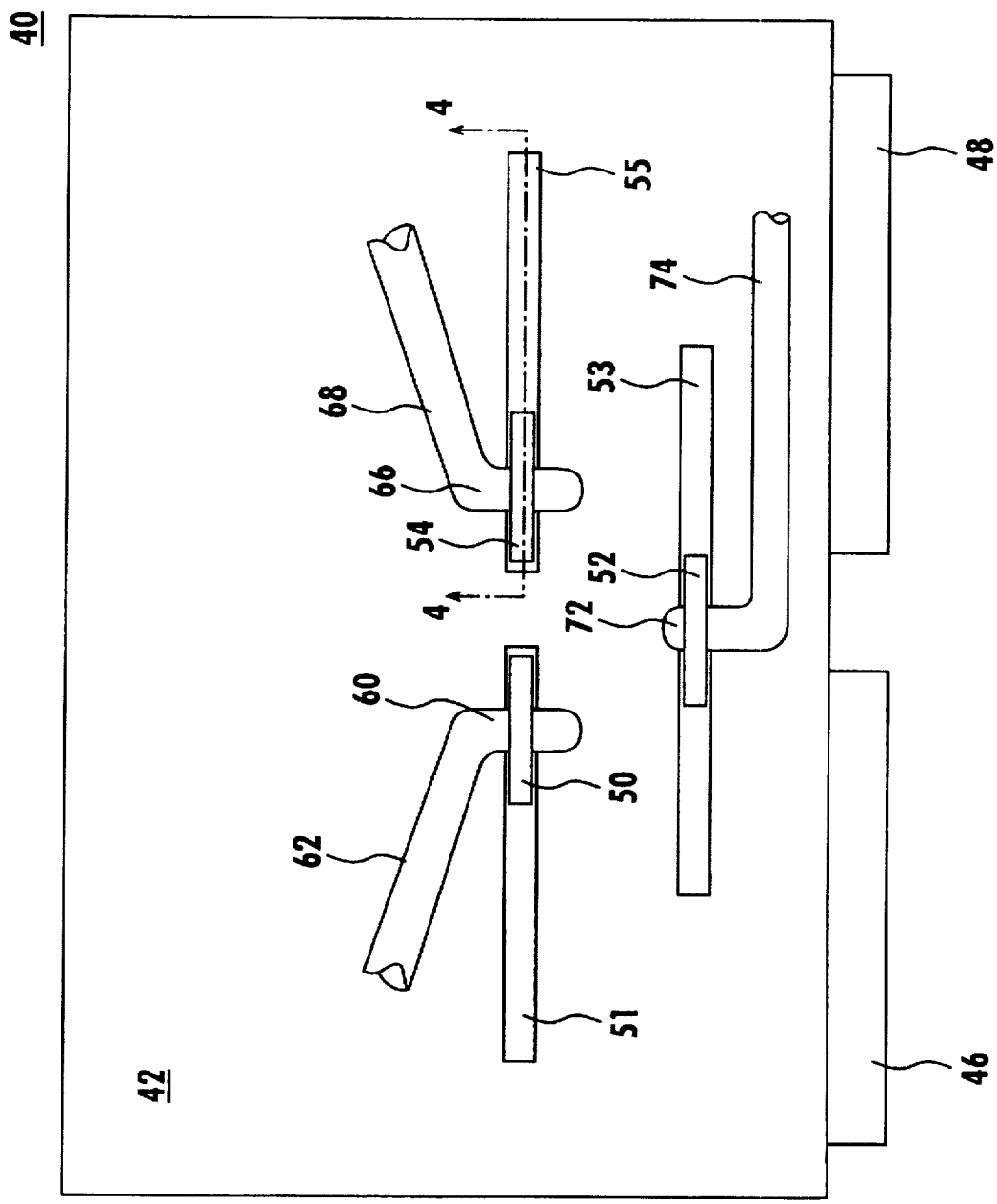
FIG. 2 is a top view of the memory seat module.

As shown in FIGS. 2 and 3, integrated into the memory module are three sensors formed as linear potentiometers. Projecting out of the upper surface 42 of the module 40 are three potentiometer shafts 50, 52, 54, each of which can travel along the length of its respective slot 51, 53, 55 formed on the upper surface 42 of the module 40. Each of the shafts belongs to a corresponding linear potentiometer, 100, 102, 104, similar to the potentiometer 56 shown in FIG. 4. As is known to those skilled in the art, such a sensor outputs a signal reflective of a change in position of its corresponding shaft relative to its body 58. It may, instead, be configured to output a signal reflective of the absolute position of the shaft relative to its body.

Potentiometer shaft 50 is attached to a first end 60 of linkage 62. The attachment on the shaft 50 is at a point above the upper surface 42 of the memory seat module. The second end 64 of linkage 62 is attached to the seat tilt member 26 at a forward portion 28 thereof. In the preferred embodiment, the linkage 62 is rigidly fixed at both ends. Thus, the linkage 62 and potentiometer shaft 50 and the latter's attached potentiometer act together as a forward vertical position sensor. When the seat tilt member 26 tilts at its forward end, the movement of the forward portion 28 of the seat tilt member 26 is translated into a motion which moves the potentiometer shaft 50 relative the body 58 of its potentiometer. This causes its potentiometer to output a signal. This signal comprises information reflective of the change in vertical position of the forward portion 28 of the seat tilt member 26 relative to the base. As is known to those skilled in the art, the signal may, alternatively, comprise information about the absolute vertical position of the forward portion of the tilt member relative to the base, or to the memory seat module, or some other reference.

Potentiometer shaft 54 is attached to a first end 66 of linkage 68. The second end 70 of linkage 68 is attached to the seat tilt member 26 at a rearward portion 30 thereof. The potentiometer shaft 54 and the linkage 68, together with the potentiometer associated with potentiometer shaft 54 act together as a rearward vertical position sensor. They sense changes in the vertical position of the rearward portion 30 of the seat tilt member 26 relative to the base member or, alternatively, detect the absolute vertical position of the rearward portion 30 relative to the base member. In most other respects, they work much the same as shaft 50, linkage 62 and their associated potentiometer housed in the memory seat module 40.

The forward 28 and rearward 30 portions of the seat tilt member do not act independently. When one of the vertical motors 90, 94 is activated, a change occurs at both vertical positions sensors. This is due to the fact that these position sensors are not mounted on the exact vertical mechanical pivot points. If they were, then only one output would change when one motor was activated. Software resident in the controller 106 of the memory seat module 40 compensates for this.

Potentiometer shaft 52 is attached to a first end 72 of linkage 74. The second end 76 of linkage 74 is attached to the seatback panel 32. Potentiometer shaft 52 and linkage 74 and their associated potentiometer are arranged to detect a tilt in the seatback panel 32 and thus serve as a seatback recliner position sensor. In the embodiment of FIG. 1, when the seatback tilts backwards, the potentiometer shaft 52 slides forward, towards the front of the seat frame 20.

The linear potentiometers of the preferred embodiment work by having the shaft slide along the potentiometer body. Thus, as shown in FIG. 4, it is preferable that the angle a formed between the linkage and the direction of motion of the shaft be shallow. This will provide a maximum degree of sensitivity in the output signal from the potentiometer. One way to ensure a shallow angle is to mount the potentiometers within the memory seat module so that the direction of travel of the shaft parallels the direction of travel of the linkage. Another way to enhance sensitivity is to use linkages having multiple members arranged to pivot about a point so as enhance the motion of the shaft.

With regard to the linear potentiometers, the operation of the unit will now be explained. A movement of either the seatback 32 or the seat tilt member 26 causes one or more linkage(s) to move as well. The potentiometer shafts corresponding to those linkages also move, and slide relative of the body of their respective linear potentiometers.

As known to those skilled in the art, when the shaft 50, 52, 54 of a linear potentiometer 56 is moved relative to its body 58, the linear potentiometer produces an electrical signal reflective of at least one of the a) change in position and b) the absolute position of the shaft relative to its body. This signal is ultimately presented to an electronic controller 106 which, in the preferred embodiment, resides in the memory seat module. As is known to those skilled in the art, the controller can be a microprocessor or a microcontroller, or some other equivalent unit. The controller 106 either is connected to, or comprises an electronic memory 108, such as a RAM, which stores this position information.

While the preferred embodiment shows the use of linear potentiometers, it may also be possible to use rotary potentiometers. In such case, one end of the linkage would be rotatably mounted to the potentiometer and the potentiometer would output a signal in response to a rotation at that end of the linkage. This arrangement is advantageous in those cases wherein the movement of the adjustable member, i.e., the seat tilt member or the seatback panel in the preferred embodiment, would be transverse to the direction of motion of a linear potentiometer's shaft. Furthermore, depending on how one might want to configure the sensors and the points of attachment, sensors which detect changes in compressive or extensive forces between two points, e.g., strain gauges, may be used in conjunction with, or in place of the linkages to measure changes in the position of an adjustable member relative to the sensor.

Figure 5:
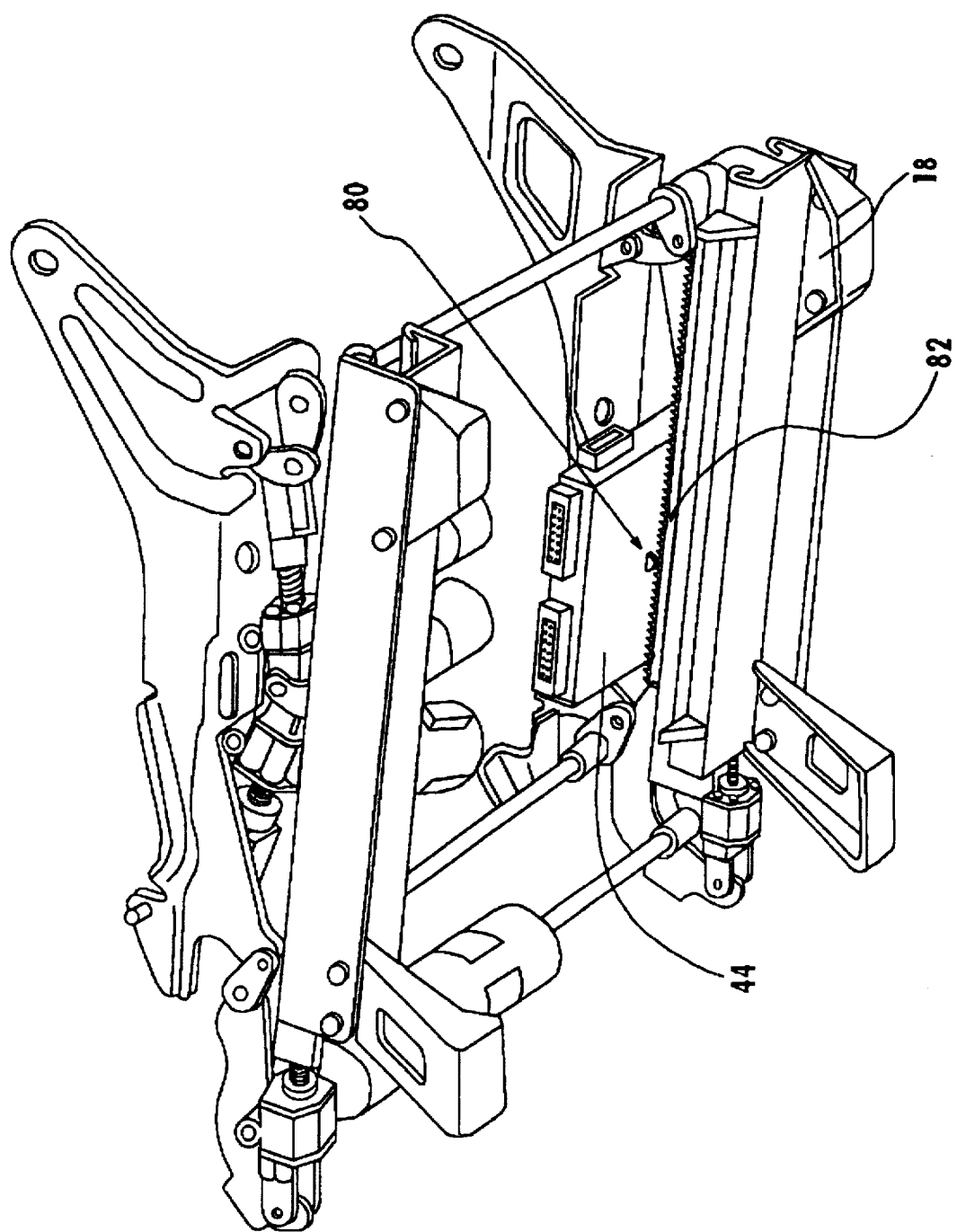
FIG. 5 is a bottom perspective view of a memory seat module installed in a seat assembly.

In addition to adjusting the forward and rearward vertical positions of the seat, and the inclination of the seatback, one typically wants to control the horizontal movement of the seat along a longitudinal axis A of the seat frame. The memory seat module of the present invention is provided with means for sensing the horizontal position of the seat frame. As shown in FIG. 5, these means are mounted on the bottom surface 44 of the memory seat module 40.

Figure 6:
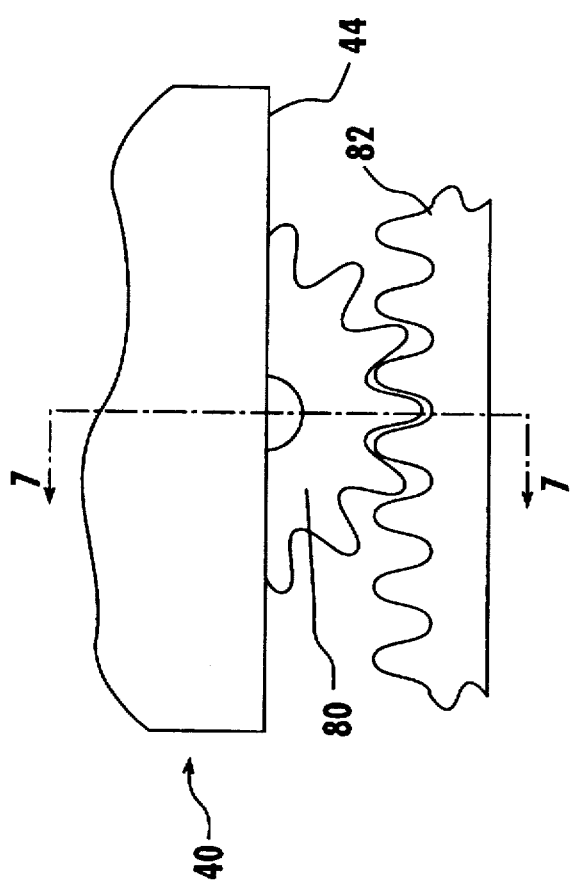
FIG. 6 is an enlarged view of the sensor gear on the memory seat module taken along arrow 6 in FIG. 5.

As shown in the enlarged view of FIG. 6, a rotary sensor gear 80 projects part-way through the bottom surface 44. The sensor gear is rotatably mounted to the memory seat module 40 and is engaged to a gear rack 82. Gear rack 82, in turn, is mounted to a portion of the guide rail 18, and thus is fixed to the stationary base 12 while the memory seat module 40 is mounted on the guide 24 belonging to the seat frame 20. When the motor 92 is energized, the seat frame 20 moves horizontally along the longitudinal axis A, and the guide 24 and the memory seat module 40 moves along with it. However, the gear rack 82, being fixedly mounted to the stationary base 12, does not move along the longitudinal axis. As a consequence, the sensor gear 80 is turned by the moving module 40 as the latter passes by the immovably mounted gear rack 82.

Alternatively, the memory module can be fixedly mounted to the stationary base 12 and the gear rack 82 mounted on the guide 24 of the seat frame 20. In such case, the memory seat module 40 does not move along the longitudinal axis. Instead, the gear rack 82 travels along the longitudinal axis A with the seat frame 20 when the motor 92 is energized. Thus, when the seat frame 20 moves along the longitudinal axis A, the gear 80 is turned by the gear rack 82 as the latter passes by the immovably mounted memory seat module 40.

Figure 7:
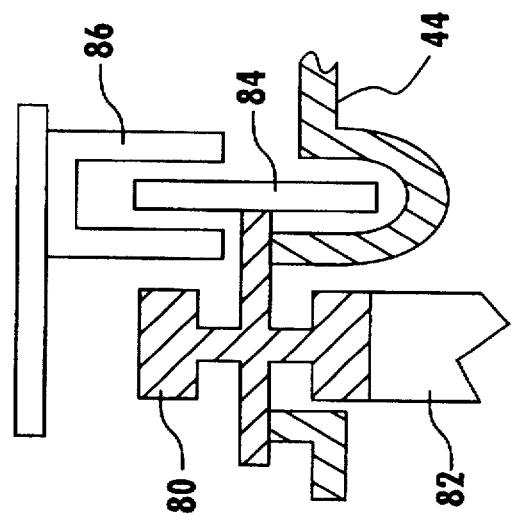
FIG. 7 is a cross-sectional view along section line 7—7 in FIG. 6.
Figure 8:
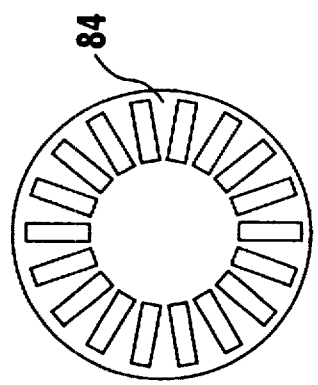
FIG. 8 shows a partial side view of the encoder disk shown in FIG. 7.

As shown in FIG. 7, sensor gear 80 turns with an optical encoder disk 84. As shown in FIG. 8, the encoder disk 84 is provided with a plurality of slots radially arranged around its periphery. One end of the encoder disk rotates between a transmitter and a receiver belonging to an optical detector 86. As the encoder disk 84 is turned by the gear rack 82 via the sensor gear 80, light from the transmitter is interrupted by the rotating encoder disk 84, causing the detector to output pulses. These pulses represent a signal reflective of the change in horizontal position of the seat frame 20 relative to the gear rack 82.

Figure 9:
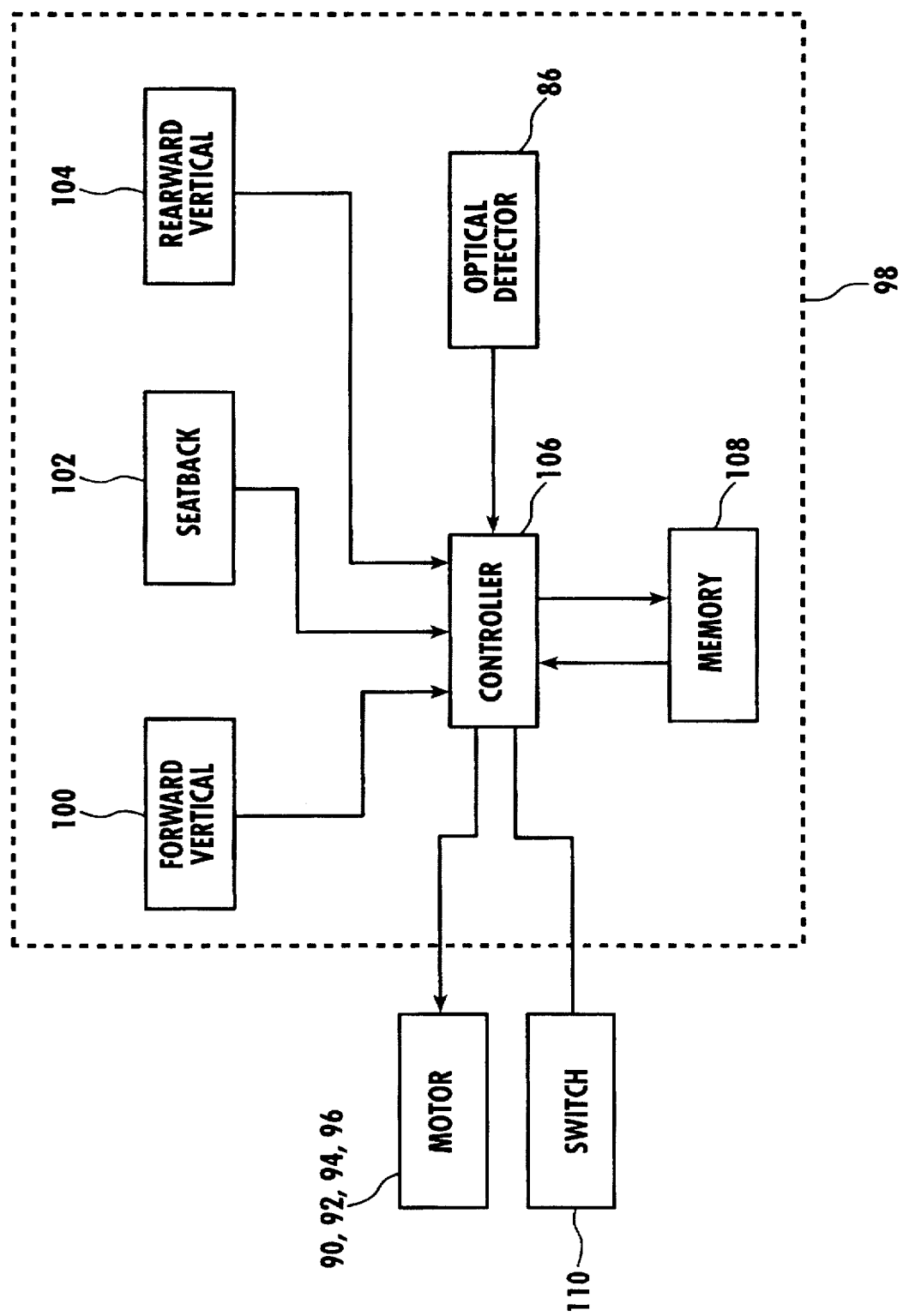
FIG. 9 shows a block diagram of electrical circuitry used with the memory seat module.

FIG. 9 shows a block diagram of electrical circuitry 98 associated with the memory seat module. Position information from the three linear potentiometers 100, 102, 104 as well as the optical detector 86 mounted on the bottom surface 44 of the control module 40 are all stored within the control module 40. The signals carrying position data from each of the four sensors are sent to the controller 106 which then stores the position information in an electronic memory 108 for later recall. As stated above, the controller 106 and the electronic memory 108 preferably are resident in the memory seat module. This, however, is not an absolute necessity. The may, for instance, be part of a separate controller unit which is electrically connected to the memory seat module.

During operation, the seat, and thus the seat frame members are initially in a first position at a first point in time. The seat is then adjusted and one or more of the seat members is moved to a second position. Information about this movement and/or about the first and second positions is stored the memory means. At a later time, a user may then request that the seat be returned to the first position. This request comes in the form of a electrical signal from a remote switch 110 external to the memory seat module. The controller 106 processes this request signal, retrieves the position information from the electronic memory 108, and issues control signals via control lines 112 to the motors to restore the seat to its previous position.

While there has been described what is at present considered to be a preferred embodiment of this invention, it will be clear to those skilled in art that various changes and modifications may be made without departing from the invention. For instance, while the preferred embodiment shows potentiometers and an optical encoder, other sensor technology such as Hall effect sensors and bar code sensors may also be used. The present invention is intended to cover all such changes and modifications as fall within the true spirit and scope of the claims set forth hereunder.

What is claimed is:

1. A power seat assembly comprising:
   a base member having a longitudinal axis;
   a seat frame mounted on said base member, said seat frame comprising at least one adjustable member arranged to move relative to said base member;
   at least one motor, said motor operatively engaged to said adjustable member and arranged to move said adjustable member relative to said base member;
   a memory seat module mounted on one of said seat frame and said base member, said memory seat module comprising:
      at least one sensor arranged to detect a movement of said adjustable member, from a first position to a second position relative to said memory seat module, and output information reflective of said movement; and
      electronic means connected to said at least one sensor and arranged to store said information, said electronic means further arranged to retrieve said information in response to an external signal to return said at least one adjustable member to said second position from said first position; and
   a linkage having a first portion connected to said adjustable member and a second portion connected to said sensor, said linkage and said sensor arranged to translate said movement of said adjustable member relative to said memory seat module into said information.

2. The assembly of claim 1 further comprising
   a seatback provided on said seat frame; wherein
   said linkage is connected between said seatback and said at least one sensor and said at least one sensor is arranged to detect a change in an orientation of the seatback relative to said memory seat module.

3. The assembly of claim 1 further comprising:

a seat tilt member provided on said seat frame, said seat tilt member having a forward portion and a rearward portion;

first and second sensors; and first and second linkages connected between respective said first and second sensors and said forward portion and said rearward portion, respectively, wherein the first sensor and first linkage are arranged to detect a change in a vertical position of said forward portion relative to said memory seat module, and the second sensor and second linkage are arranged to detect a change in a vertical position of said rearward portion relative to said memory seat module.

4. The assembly of claim 3 further comprising:

a seatback provided on said seat frame;

a third sensor; and a third linkage connected between said seatback and said third sensor; wherein said third sensor is arranged to detect a change in an orientation of the seatback relative to said base frame.

5. The assembly of claim 4 wherein said first, second and third sensors are linear potentiometers, each potentiometer having a shaft, each shaft having a corresponding linkage connected thereto.

6. The assembly of claim 4 further comprising:

a gear rack mounted on the other of said seat frame and said base member;

a gear rotatably mounted on said memory seat module and engaged to said gear rack, said gear arranged to rotate when said seat frame moves along said longitudinal axis; and a fourth sensor arranged to detect a rotation of said gear.

7. The assembly of claim 6 wherein said fourth sensor comprises:

an encoder disk operatively connected to said gear and rotating therewith; and an optical encoder arranged to detect a rotation of said encoder disk and output a signal reflective of a movement of said seat frame relative to said base member along said longitudinal axis.

8. The assembly of claim 1 further comprising:

a gear rack mounted on the other of said seat frame and said base member;

a gear rotatably mounted on said memory seat module and engaged to said gear rack, said gear arranged to rotate when said seat frame moves along said longitudinal axis; wherein said at least one sensor is arranged to detect a rotation of said gear.

9. The assembly of claim 8 wherein said at least one sensor comprises:

an encoder disk operatively connected to said gear and arranged to turn therewith; and an optical encoder arranged to detect a rotation of said encoder disk and output a signal reflective of a movement of said seat frame relative to said base member along said longitudinal axis.

10. In a power seat assembly having a base member having a longitudinal axis;

a seat frame mounted on said base member, said seat frame comprising a seat tilt member having a forward portion and a rearward portion and a seatback member, said seat tilt member and said seatback member arranged to move relative to said base member;

a first motor arranged to adjust an orientation of said seatback member relative to said base member; and a second motor arranged to adjust a tilt of said seat tilt member relative to said base member;

the improvement comprising:

a memory seat module mounted on one of said seat frame and said base member, said memory seat module comprising first, second and third sensors;

first and second linkages connected between respective said first and second sensors and said forward portion and said rearward portion, respectively; and a third linkage connected between said third sensor and said seatback member, wherein the first sensor and first linkage are arranged to detect a change in a vertical position of said forward portion relative to said memory seat module, the second sensor and second linkage are arranged to detect a change in a vertical position of said rearward portion relative to said memory seat module, and the third sensor is arranged to detect a change in an orientation of the seatback relative to said memory seat module.

11. The improvement of claim 10 wherein the assembly further comprises:

a gear rack mounted on the other of said seat frame and said base member;

a gear rotatably mounted on said memory seat module and engaged to said gear rack, said gear arranged to rotate when said seat frame moves along said longitudinal axis; and a fourth sensor arranged to detect a rotation of said gear.

12. The improvement of claim 11 wherein said fourth sensor comprises:

an encoder disk operatively connected to said gear and rotating therewith; and an optical encoder arranged to detect a rotation of said encoder disk and output a signal reflective of a movement of said seat frame relative to said base member along said longitudinal axis.

13. A power seat assembly comprising:

a base member having a longitudinal axis;

a seat frame mounted on said base member, said seat frame comprising at least one adjustable member arranged to move relative to said base member;

at least one motor, said motor operatively engaged to said adjustable member and arranged to move said adjustable member relative to said base member;

a memory seat module mounted on one of said seat frame and said base member, said memory seat module comprising:

at least one sensor arranged to detect a movement of said adjustable member, from a first position to a second position relative to said memory seat module, and output information reflective of said movement; and a linkage having a first portion connected to said adjustable member and a second portion connected to said sensor, said linkage and said sensor arranged to translate said movement of said adjustable member relative to said memory seat module into said information.

14. A power seat assembly comprising:

a base member having a longitudinal axis;

a seat frame mounted on said base member;

at least one motor operatively engaged to said seat member and arranged to move said seat frame relative to said base member along said longitudinal axis;

a memory seat module mounted on one of said seat frame and said base member, said memory seat module comprising:
- at least one sensor arranged to detect a movement of said seat frame from a first position to a second position relative to said base member along said longitudinal axis and output information reflective of said movement; and
- electronic means connected to said at least one sensor and arranged to store said information, said electronic means further arranged to retrieve said information in response to an external signal to return said seat frame to said second position from said first position.

15. A memory seat module adapted to be mounted in a seat assembly, said memory seat module comprising:

at least one sensor arranged to detect a movement of an external member, from a first position to a second position relative to said memory seat module, and output information reflective of said movement; and electronic means connected to said sensor and arranged to store said information, said electronic means further arranged to retrieve said information in response to a signal received from outside the memory seat module.

16. The memory seat module of claim 15 wherein said electronic means comprises:

a controller arranged to receive said information from said sensor; and electronic memory means connected to said controller and arranged to store said information, and wherein said electronic memory means provides said stored information to said controller in response to a signal received by said controller from outside the memory seat module.

17. The memory seat module of claim 16 comprising three such sensors, each sensor formed as a linear potentiometer having a shaft projecting from a housing of said memory seat module.

18. The memory seat module of claim 17 further comprising:

a gear rotatably mounted on said housing, at least a portion of said gear projecting from said housing; and a fourth sensor integrated into said memory seat module and arranged to detect a rotation of said gear.

19. The memory seat module of claim 18 wherein said fourth sensor comprises an encoder disk operatively connected to said gear and rotating therewith; and an optical encoder arranged to detect a rotation of said encoder disk and output a signal reflective of said rotation.

20. The memory seat module of claim 15 further comprising:

a gear rotatably mounted on a housing of said memory seat module, at least a portion of said gear projecting from said housing; and wherein said sensor is arranged to detect a rotation of said gear.

21. The memory seat module of claim 20 wherein said sensor comprises an encoder disk operatively connected to said gear and rotating therewith; and an optical encoder arranged to detect a rotation of said encoder disk and output a signal reflective of said rotation.

* * * * *